(12) United States Patent
Murakami

(10) Patent No.: US 8,738,762 B2
(45) Date of Patent: May 27, 2014

(54) ELECTRONIC DEVICE AND LOG-OUTPUT METHOD

(75) Inventor: Hirofumi Murakami, Kanagawa (JP)

(73) Assignee: Sony Corporation (JP)

( * ) Notice: Subject to any disclaimer, the term of this patent is extended or adjusted under 35 U.S.C. 154(b) by 1399 days.

(21) Appl. No.: 11/787,660

(22) Filed: Apr. 17, 2007

(65) Prior Publication Data

US 2007/0256756 A1 Nov. 8, 2007

(30) Foreign Application Priority Data

Apr. 20, 2006 (JP) ................ P2006-116364

(51) Int. Cl.
*G06F 15/173* (2006.01)
*G06F 15/16* (2006.01)
*G06F 3/00* (2006.01)

(52) U.S. Cl.
USPC ............ 709/224; 709/209; 715/733

(58) Field of Classification Search
USPC ................................ 709/223, 224
See application file for complete search history.

(56) References Cited

U.S. PATENT DOCUMENTS

| | | | | |
|---|---|---|---|---|
| 6,198,479 | B1 * | 3/2001 | Humpleman et al. | 715/733 |
| 6,473,788 | B1 * | 10/2002 | Kim et al. | 709/209 |
| 6,931,447 | B1 | 8/2005 | Hemstreet et al. | |
| 7,232,063 | B2 * | 6/2007 | Fandel et al. | 235/383 |
| 7,653,896 | B2 * | 1/2010 | Herdeg, III | 717/113 |
| 2002/0178382 | A1 * | 11/2002 | Mukai et al. | 713/201 |
| 2005/0138071 | A1 * | 6/2005 | Goodman et al. | 707/104.1 |
| 2006/0070075 | A1 * | 3/2006 | Rodionov | 718/102 |
| 2007/0188594 | A1 * | 8/2007 | Yoshino | 348/14.1 |
| 2007/0207774 | A1 * | 9/2007 | Hutchinson et al. | 455/406 |

FOREIGN PATENT DOCUMENTS

| | | |
|---|---|---|
| JP | 05189274 A | 7/1993 |
| JP | 2003006002 A | 1/2003 |
| JP | 2004297777 A | 10/2004 |
| JP | 2005-204183 A | 7/2005 |

OTHER PUBLICATIONS

Jander, M:, "Welcome to the Revolution", Data Communications, McGraw Hill, New York, vol. 25, No. 16, Nov. 21, 1996, pp. 39-42, 44, 46.

Heilbronner S., et al:, "Managing PC Networks", IEEE Communications Magazine, IEEE Service Center, New York, vol. 35, No. 10, Oct. 1, 1997, pp. 112-117.

Office Action from Japanese Application No. 2006-116364, dated Oct. 26, 2010.

* cited by examiner

*Primary Examiner* — Scott Christensen
*Assistant Examiner* — Joiya M Cloud
(74) *Attorney, Agent, or Firm* — Lerner, David, Littenberg, Krumholz & Mentlik, LLP

(57) ABSTRACT

An electronic device may include a server configured to present a log-acquisition environment to a terminal device connected to the electronic device via a network, receive macro-file data and a log-acquisition request that are transmitted from the terminal device by using the log-acquisition environment, and transmit first log information to the terminal-device side according to the log-acquisition request, and a macro-processing unit configured to capture second log information of an operation task by performing processing on the basis of the macro-file data transmitted from the server, and store the second log information, as the first log information transmitted to the terminal-device side by the server.

6 Claims, 6 Drawing Sheets

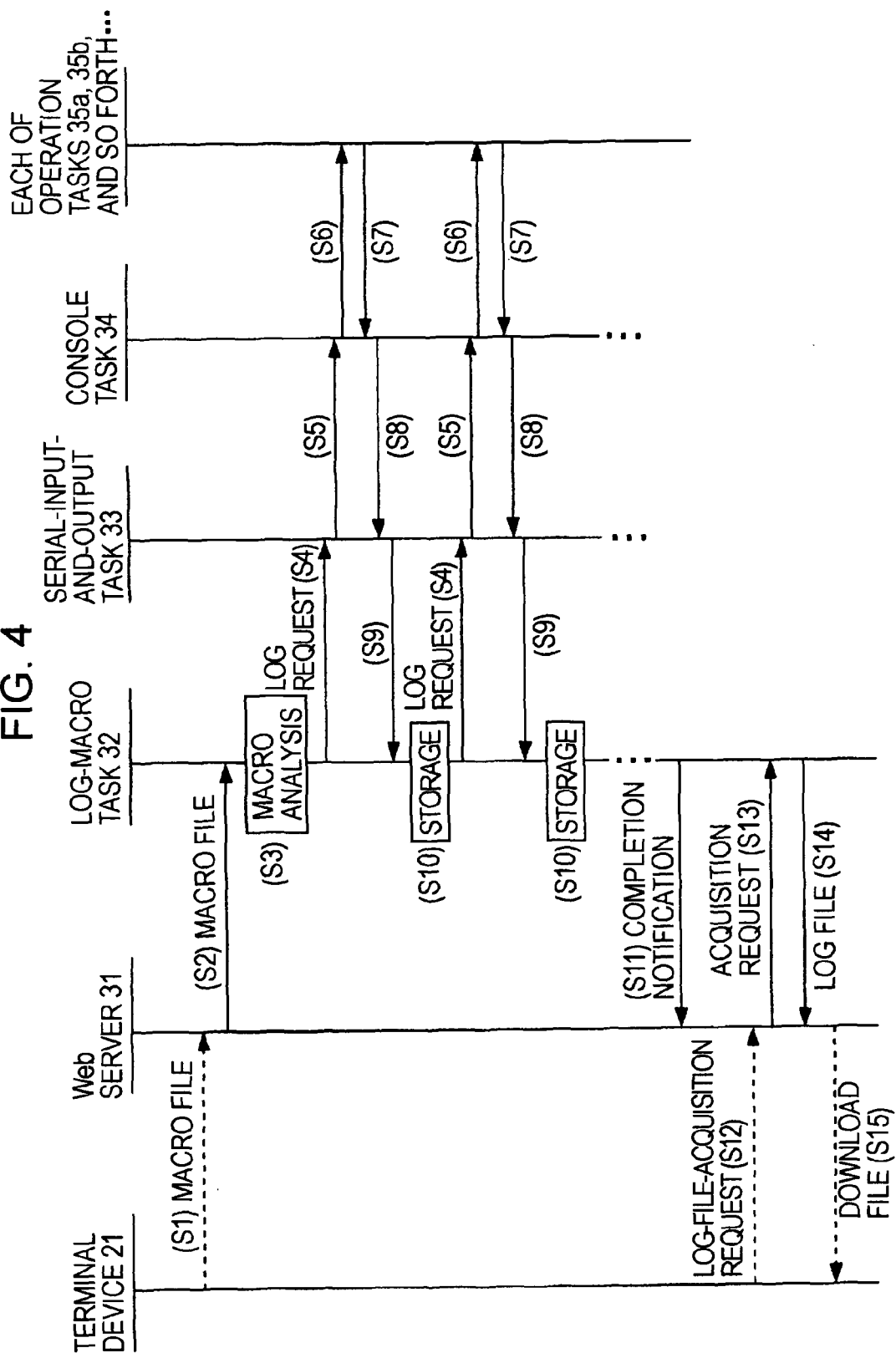

ELECTRONIC DEVICE AND LOG-OUTPUT METHOD

CROSS-REFERENCE TO RELATED APPLICATIONS

This application claims priority from Japanese Patent Application No. JP 2006-116364 filed in the Japanese Patent Office on Apr. 20, 2006, the entire content of which is incorporated herein by reference.

BACKGROUND OF THE INVENTION

1. Field of the Invention

The present invention relates to an electronic device and a method of outputting data on a log of the electronic device.

2. Description of the Related Art

In recent years, various types of electronic devices including a video device, an audio device, a recording-and-reproducing device, a communication device, an information-processing device, and so forth have been used. Particularly, electronic devices including a controller provided, as a micro computer and/or a processor, have been used, where the controller controls operations performed by the electronic device. If a problem occurs in the above-described electronic devices, data on the log of each of operations tasks functioning on the microcomputer and/or the processor is analyzed, so as to determine the reason why the problem occurs.

SUMMARY OF THE INVENTION

In the past, if a user of the electronic device wishes to confirm the log data indicating how each of the operation tasks of the electronic device functions, the user removes the outer sheath of the electronic device, and connects a computer device such as a personal computer (PC) to a connection terminal such as a recommended-standard (RS) 232C terminal provided on a substrate or the like installed in the electronic device so that the computer device and the controller of the electronic device can communicate with each other.

Then, the controller of the electronic device acquires data on the log of each of the operation tasks, transmits the log data to the computer device according to an instruction transmitted from the computer device so that the log data can be confirmed on the computer-device side.

However, the above-described configuration may have the following problems.

If a problem occurs in the above-described electronic devices, a maintenance-service staff who inspects and/or repairs the electronic device wishes to confirm the log data, so as to determine the reason why the problem occurs and/or take measures against the problem with efficiency. In some cases, a result of the log-data confirmation shows that the problem can be solved by informing the user of the measures that should be taken against the problem through a phone call, an electronic mail, and so forth so that the user can solve the problem even though the user does not bring the electronic device to the maintenance-service staff. Accordingly, if a problem occurs in the electronic device on the ordinary user's side, it is desirable that the user should acquire the log data from the electronic device and submit the log data to the maintenance-service staff.

However, it is difficult for the user to remove the outer sheath or cabinet of the electronic device, connect the PC to the electronic device, acquire the log data, and transmit the log data to the maintenance-service staff in the above-described manner. Further, even though the user removes the cabinet of the electronic device in the above-described manner, another problem may occur in the electronic device due to the removal of the cabinet. Thus, it is difficult for the user to open the cabinet in most cases. Therefore, even though the problem can be easily solved on the user's side by informing the user of the measures that should be taken against the problem, the user has to bring the electronic device into a shop where the maintenance-service staff is present. Consequently, the user has to expend much effort and suffer great time losses until the electronic device is repaired.

Still further, if the user knows how to acquire the log data from the electronic device, the user has to take the trouble to perform the above-described operations and install a software program in the user's PC, the software program being provided for acquiring the log data by performing the above-described operations.

Still further, if the user who knows how to acquire the log data and/or the maintenance-service staff transmits an erroneous command to the electronic device while the user connects the PC to the electronic device and performs the above-described operations, another problem may occur in the electronic device.

Accordingly, the present invention has been achieved, so as to acquire the log data easily from the electronic device, and make the maintenance-service staff or the like capable of acquiring the log data even though the electronic device is in a remote location.

An electronic device according to an embodiment of the present invention may include a server configured to present a log-acquisition environment to a terminal device connected to the electronic device via a network, receive macro-file data and a log-acquisition request that are transmitted from the terminal device by using the log-acquisition environment, and transmit first log information to the terminal-device side according to the log-acquisition request, and a macro-processing unit configured to capture second log information of an operation task by performing processing on the basis of the macro-file data transmitted from the server, and stores the second log information, as the first log information transmitted to the terminal-device side by the server.

Further, the macro-processing unit may capture the second log information of the operation task, the second log information being provided, as binary data, as third log information including at least one string, and store the third log information, as log-file data that should be transmitted to the terminal device.

A log-output method according to another embodiment of the present invention may include the steps of presenting a log-acquisition environment to a terminal device connected to an electronic device via a network, receiving macro-file data transmitted from the terminal device by using the log-acquisition environment, capturing first log information of an operation task by performing processing on the basis of the received macro-file data and storing the first log information, as second log information transmitted to the terminal-device side, receiving a log-acquisition request transmitted from the terminal device by using the log-acquisition environment, and transmitting the stored second log information to the terminal-device side according to the log-acquisition request.

Namely, an electronic device according to an embodiment of the present invention may include a server presenting a log-acquisition environment to a terminal device connected to the electronic device via a network, such as a world-wide-web (WWW) server, so as to present the log-acquisition environment to an external terminal device, as a Web page or the like, the external terminal device being connected to the network such as the Internet. The external terminal device may be provided, as a computer device or the like used by a service staff or the like who wishes to acquire data on the log of the electronic device, for example.

The terminal device may transmit macro-file data by using the log-acquisition environment provided, as the Web page or the like. If the server receives the macro-file data transmitted from the terminal device, the macro-processing unit may interpret the macro-file data, and acquire and store the log information of each of the operation tasks by performing the processing on the basis of the macro-file data. The stored log information, such as log-file data including the log information of each of the tasks, as American-Standard-Code-for-Information-Interchange (ASCII) data, may be transmitted from the server to the terminal device according to the log-acquisition request transmitted from the terminal device.

The term "task" may indicate the unit of processing performed in the system of the electronic device and the term "log" may indicate the record (history) of time-series processing performed in each of the tasks. Namely, the log may indicate information about the progress of a memory-access operation, a data-update operation, and so forth performed by the task.

The term "macro" may indicate a function performed, so as to call and execute a registered series of processing procedures. The term "macro-file data" may denote data on a file including data on the macro.

BRIEF DESCRIPTION OF THE DRAWINGS

FIG. 4 illustrates operations performed, so as to perform the log acquisition according to the above-described embodiment;

DETAILED DESCRIPTION

Hereinafter, a first embodiment of the present invention will be described with reference to the attached drawings. According to the first embodiment, a recording-and-reproducing device 1 shown in FIGS. 1 and 2 will be described, as an example electronic device.

Figure 1:
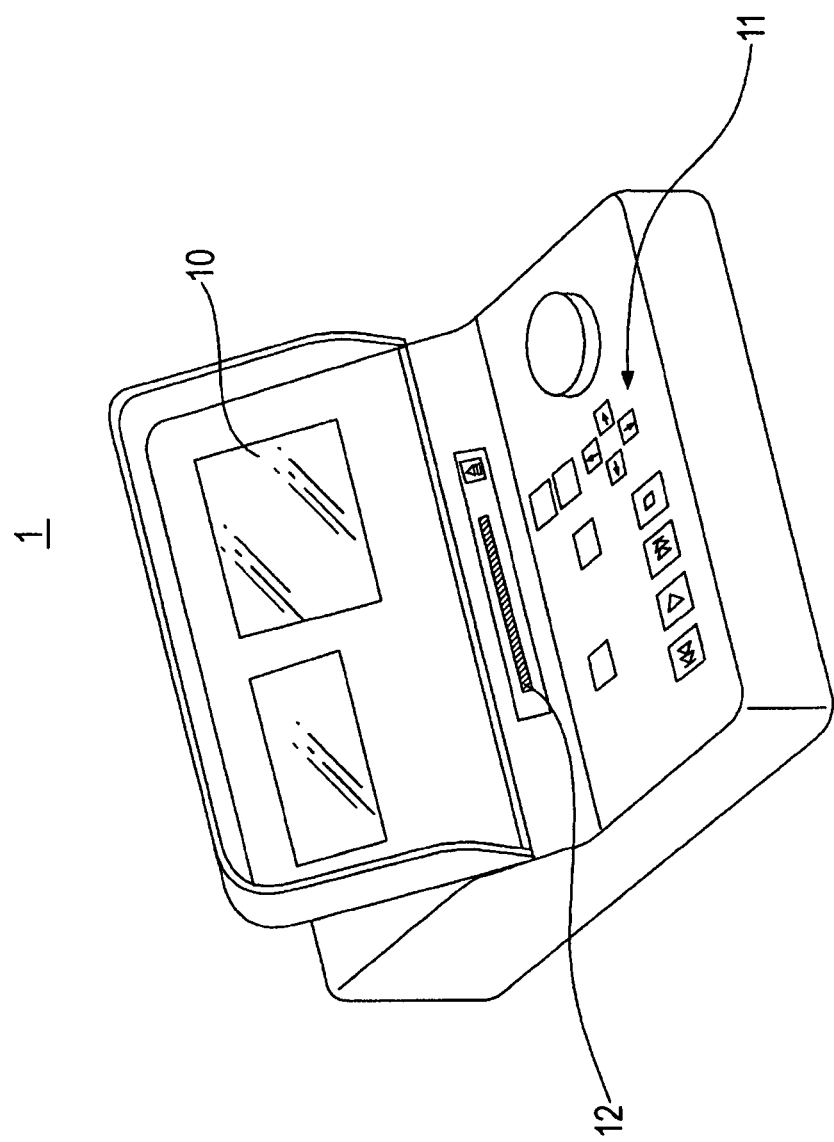
FIG. 1 is a perspective view of a recording-and-reproducing device provided, as an electronic device according to an embodiment of the present invention.

FIG. 1 is a perspective view of an outward appearance of the recording-and-reproducing device 1, which is a portable video-editing device for commercial use. The portable video-editing device is used by a person involved in television (TV) broadcasting, a program creator, and so forth, so as to edit data on video shot at a shooting site or the like, for example. An optical disk can be loaded into the recording-and-reproducing device 1, as a record medium, so that video data recorded onto the optical disk can be edited, for example.

The recording-and-reproducing device 1 has a disk-load unit 12 so that the optical disk can be loaded into the disk-load unit 12, as shown in FIG. 1.

Further, the recording-and-reproducing device 1 has a display unit 10 configured to display video or the like reproduced from the optical disk.

Still further, the recording-and-reproducing device 1 has an operation unit 11 so that a user can transmit various information and/or operation data to the recording-and-reproducing device 1. The operation unit 11 includes various types of operators including operation keys, an operation dial, and so forth.

Figure 2:
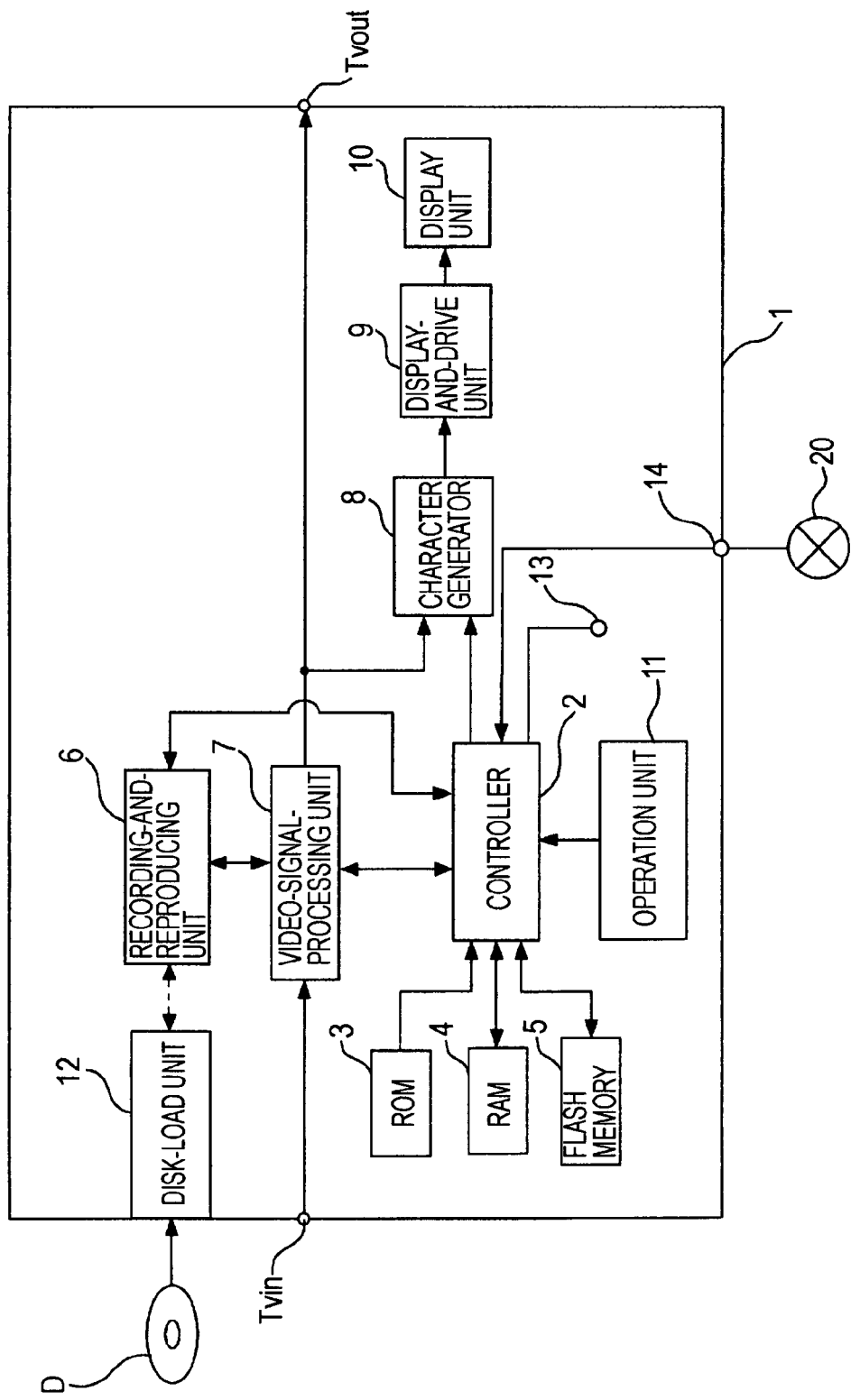
FIG. 2 is a block diagram of the above-described recording-and-reproducing device.

FIG. 2 is a block diagram schematically shows the internal configuration of the recording-and-reproducing device 1 shown in FIG. 1.

An optical disk D is loaded into the disk-load unit 12. Data is recorded and/or reproduced onto and/or from the optical disk D, where the following expressions:

$\lambda$=405 nm (where the sign $\lambda$ denotes the laser wavelength), and

NA=0.85 (where the characters NA denote the abbreviation of numerical aperture) hold. The optical disk D is provided, as an erasable and rewritable disk using a phase-transition film, as a recording film.

The optical disk D has a relatively large record capacity of about 23 gigabytes (GB). Therefore, the optical disk D can store data on high-resolution video. The optical disk D is mainly used for recording video data including image data.

A recording-and-reproducing unit 6 records and/or reproduces data onto and/or from the optical disk D loaded into the disk-load unit 12.

The recording-and-reproducing unit 6 includes an optical head, a spindle motor, a servo circuit, so as to record and/or reproduce data recorded onto the optical disk D, a decoder configured to obtain reproduced data, and an encoder configured to generate record data, and so forth.

The data reproduced from the loaded optical disk D is transmitted from the recording-and-reproducing unit 6 to a video-signal-processing unit 7. Further, data that should be recorded onto the optical disk D is transmitted from the video-signal-processing unit 7 to the recording-and-reproducing unit 6.

The recording-and-reproducing unit 6 transmits video data reproduced from the optical disk D to the video-signal-processing unit 7. Further, video data transmitted from a video-input terminal Tvin can also be transmitted to the video-signal-processing unit 7.

The video-signal-processing unit 7 performs various types of video-signal processing, that is, image-signal processing for the video data transmitted thereto. For example, the video-signal-processing unit 7 performs each of video-level-adjustment processing, chroma-level-adjustment processing, set-up-level-adjustment processing, chroma-phase-adjustment processing, system-phase-adjustment processing, synchronous-phase-adjustment processing, and so forth according to information about a set value, where the set-value information is transmitted from a controller 2 that will be described later. Namely, the controller 2 determines the set value for each of the video-level-adjustment processing, the chroma-level-adjustment processing, the set-up-level-adjustment processing, the chroma-phase-adjustment processing, the system-phase-adjustment processing, the synchronous-phase-adjustment processing, and so forth.

Data transmitted from the video-signal-processing unit 7 is supplied to a video-output terminal Tvout. Further, the data is caused to branch so that the data is also transmitted to a character generator 8.

The character generator 8 can generate data on characters including text, an icon, and so forth, and super impose the character data on video data transmitted thereto. For example, the character generator 8 can generate character data functioning, as a graphical user interface (GUI) used by a user, so as to adjust each of the above-described set values.

The character generator 8 can superimpose the character data on background video or a background image generated and displayed on the basis of the data transmitted from the video-signal-processing unit 7. Otherwise, the character generator 8 can generate image data so that nothing but characters is shown. Further, the data transmitted from the video-signal-processing unit 7 can be output, as it is, without superimposing the character data thereon. The character generator 8 switches between the above-described operations according to an instruction transmitted from the controller 2.

The data transmitted from the character generator 8 is supplied to a display-and-drive unit 9.

The display-and-drive unit 9 drives a display unit 10 including a liquid-crystal display or the like on the basis of data on video or an image, the data being transmitted from the character generator 8, so as to display an image of the data on the display unit 10. According to the above-described embodiment shown in FIG. 2, the display unit 10 includes a liquid-crystal display or the like mounted on the recording-and-reproducing device 1. However, the display unit 10 may be provided, as an external monitor device connected to the recording-and-reproducing device 1.

A controller 2 is provided, as a microcomputer including a central-processing unit (CPU), a memory area, an interface unit, and so forth. The controller 2 controls the entire recording-and-reproducing device 1 and performs calculation processing according to a started program. For example, the controller 2 controls operations performed upon receiving data on an operation performed by using the operation unit 11, a recording and/or reproducing operation performed for the optical disk D loaded into the disk-load unit 12, an access operation, and so forth.

For example, upon receiving an instruction to reproduce data recorded onto the optical disk D, the instruction being transmitted from the user through the operation unit 11, the controller 2 instructs the recording-and-reproducing unit 6 to reproduce the data recorded onto the optical disk D. Then, the recording-and-reproducing unit 6 performs an access operation and/or a reproduction operation for the optical disk D and transmits reproduced data obtained through the above-described operations to the video-signal-processing unit 7. The reproduced data or the video data transmitted to the video-signal-processing unit 7 is subjected to video-signal processing, as required, and transmitted to the character generator 8. If the data reproduction should be performed under normal conditions, the controller 2 instructs the character generator 8 to transmit the video data, as it is, in advance. The video data transmitted from the character generator 8 is supplied to the display-and-drive unit 9, and the display-and-drive unit 9 is driven and controlled on the basis of the supplied video data. Subsequently, video generated on the basis of the video data reproduced from the optical disk D is displayed.

Memories accessed by the controller 2 are provided, as a read-only memory (ROM) 3, a random-access memory (RAM) 4, and a flash memory 5.

An operation program, a program loader, and so forth of the controller 2 are stored in the ROM 3.

A data area and a task area are temporarily reserved in the RAM 4, where the data area and the task area are used by the controller 2, so as to execute the above-described program, for example.

A flash memory 5 is a nonvolatile memory which is erasable and rewritable. Further, even though the power of the flash memory 5 is turned off, data stored in the flash memory 5 is retained. The flash memory 5 stores data on various calculation coefficients, parameters used for executing the above-described program or the like, and so forth.

A terminal 13 is provided in the cabinet of the recording-and-reproducing device 1, for example, as a connection terminal configured by the RS232C or the like. The terminal 13 is used for performing a particular operation including the maintenance, repair, and so forth of the recording-and-reproducing device 1.

A terminal 14 is provided, so as to connect the recording-and-reproducing device 1 to a network 20 including the Internet and so forth. Although the terminal 14 can be connected to a communication cable so that the recording-and-reproducing device 1 is connected to the network 20 by wire, a radio-communication unit may be provided in place of the terminal 14 so that the recording-and-reproducing device 1 can be connected to the network 20 wirelessly.

Figure 3:
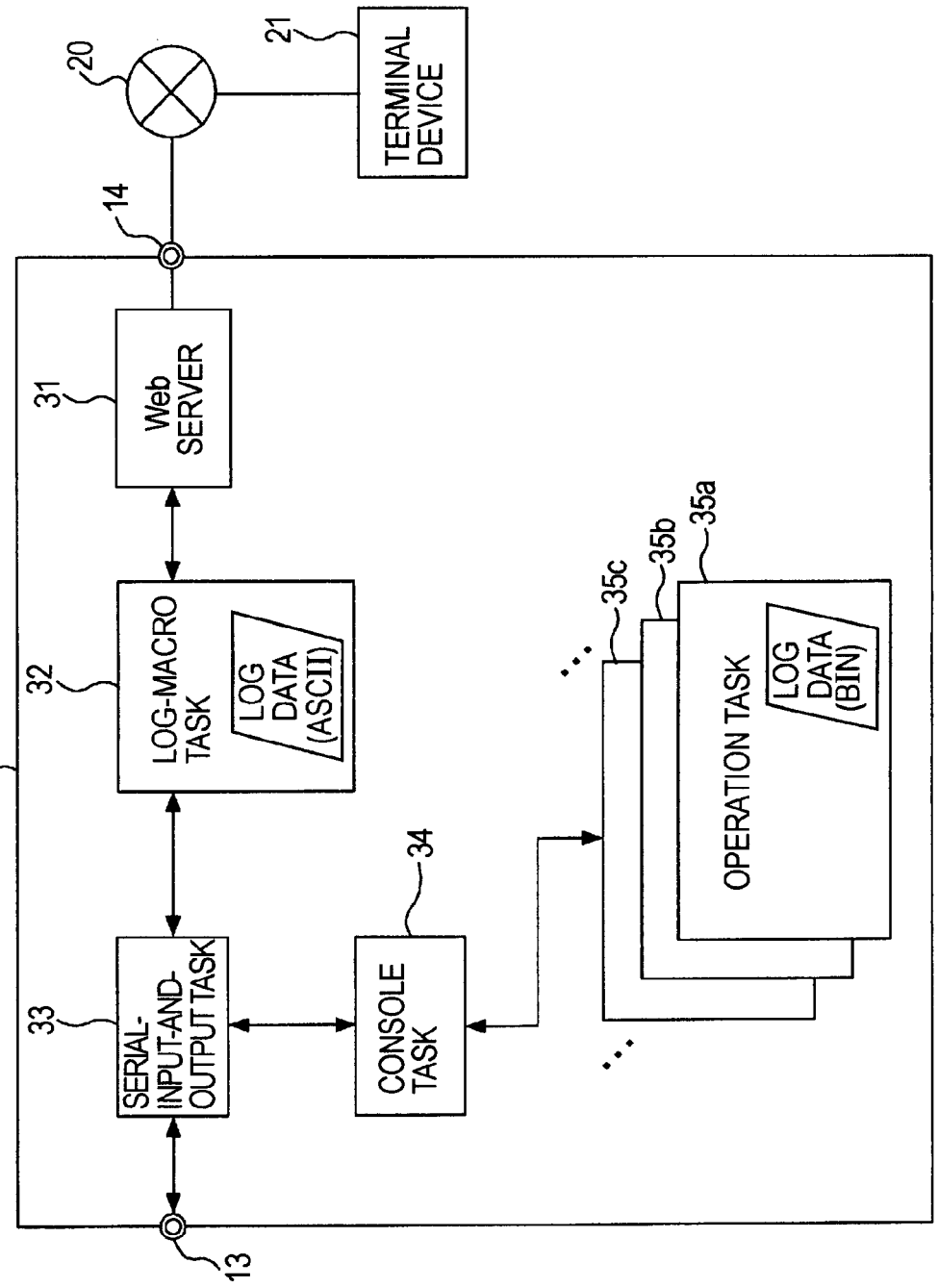
FIG. 3 is a block diagram showing a configuration provided, so as to perform log acquisition according to the above-described embodiment.

According to the first embodiment, in an electronic device such as the above-described recording-and-reproducing device 1, the controller 2 is configured, as shown in FIG. 3, so as to acquire the log of each of operations performed in the controller 2 including a microcomputer by using an external terminal device connected to the recording-and-reproducing device 1 through the network 20.

FIG. 3 shows the functional configuration of the controller 2 acquiring the log. As shown in FIG. 3, the controller 2 includes a Web server 31, a log-macro task 32, a serial-input-and-output task 33, a console task 34, and operations tasks 35*a*, 35*b*, 35*c*, and so forth.

The Web server 31 presents a Web page to the terminal device 21 connected to the network 20 such as the Internet, as a log-acquisition environment, and receives macro-file data and a log-acquisition request that are transmitted from the terminal device 21 accessing the Web server 31 and showing the Web page. Further, the Web server 31 transmits log-file data to the terminal device 21 in response to the log-acquisition request. Upon receiving the macro-file data and/or the log-acquisition request, the Web server 31 transfers the macro-file data and/or the log-acquisition request to the log-macro task 32.

The log-macro task 32 receives and analyzes the macro-file data transmitted from the Web server 31, analyzes and divides the macro-file data into strings that can be interpreted by the console task 34, and transfers the strings to the serial-input-and-output task 33.

Further, the log-macro task 32 receives an ASCII string transmitted from the serial-input-and-output task 33, and stores the ASCII string, as log data. The stored log data is transferred to the Web server 31 in response to the log-acquisition request.

The serial-input-and-output task 33 transfers serial-input data transmitted from the external device connected to the terminal 13 and/or data transmitted from the log-macro task 32 to the console task 34. Further, the serial-input-and-output task 33 transfers a string to be output such as an ASCII code transmitted from the console task 34 to the serial-input-and-output terminal 13 and/or the log-macro task 32.

The console task 34 executes a function defined by each of the operation tasks 35*a*, 35*b*, and so forth according to a debug-command string defined by each of the operation tasks 35*a*, 35*b*, and so forth, acquires an ASCII string, as an output result, and transfers the ASCII string to the serial-input-and-output task 33.

Usually, the log data is stored in each of the operation tasks 35a, 35b, and so forth, as binary data. Therefore, the console task 34 converts the binary data into text data including ASCII codes so that a maintenance-service staff or the like can confirm details on the log on the terminal-device-2 side, for example.

Each of the operation tasks 35a, 35b, and so forth denotes the unit of various processing procedures performed, so as to control various types of operations performed by an electronic device such as the recording-and-reproducing device 1. Each of the operation tasks 35a, 35b, and so forth has log data indicating the operation history of each of the operation tasks, as binary data. Details on the above-described log data can be confirmed, as the ASCII string according to a debug command issued by the console task 34.

According to the first embodiment, the recording-and-reproducing device 1 includes the controller 2 configured, as shown in FIG. 3, so that the log of the recording-and-reproducing device 1 can be acquired by using the external terminal device 21.

Hereinafter, example operations performed, so as to acquire the log of the recording-and-reproducing device 1 by using the terminal device 21 will be described, as processing steps S1 to S15 shown in FIG. 4. Further, each of FIGS. 5A, 5B, 6A, and 6B 6 shows an example Web page that is transmitted from the Web server 31 to the terminal device 21 so that the example Web page is displayed on the terminal device 21.

For confirming the log of the recording-and-reproducing device 1, the maintenance-service staff or the like using the terminal device 21 accesses the Web server 31 by using a Web-browser function of the terminal device 21.

Figure 5A:
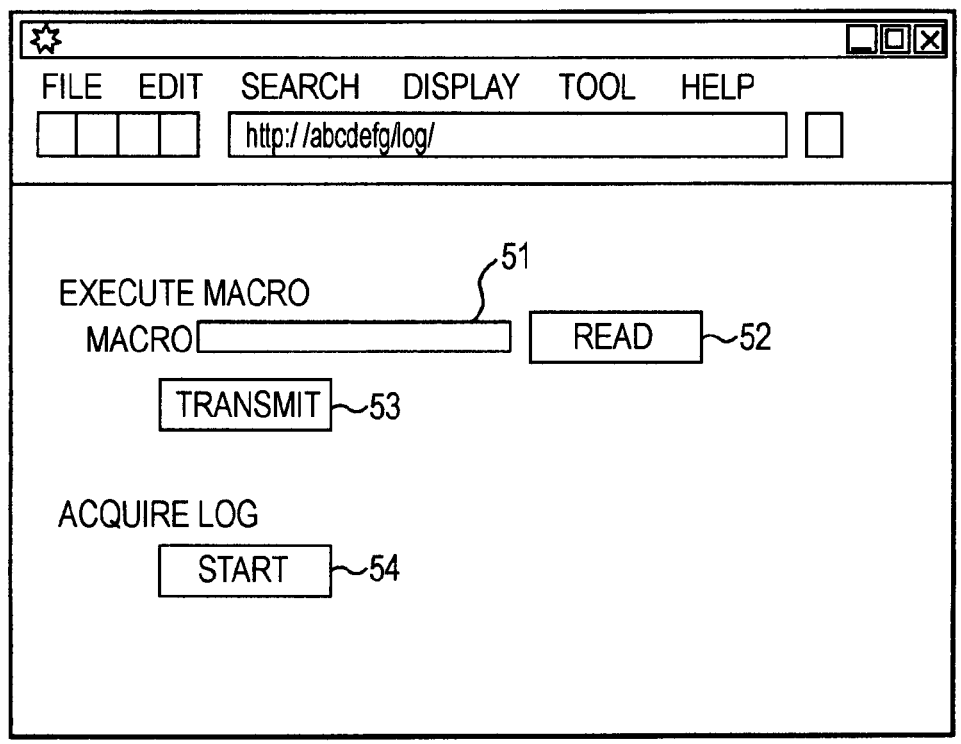
FIG. 5A illustrates a Web page according to the above-described embodiment.

Subsequently, the Web server 31 presents a Web page functioning, as the log-acquisition environment, to the terminal device 21. For example, the image of a Web page shown in FIG. 5A is shown on a display screen of the terminal device 21. A macro-specification field 51, a reference button 52, a transmission button 53, a log-acquisition-start button 54, and so forth are provided on the Web-page image shown in FIG. 5A.

First, the maintenance-service staff or the like using the terminal device 21 inputs log-acquisition-macro-file data into the macro-specification field 51 provided on the display screen shown in FIG. 5A. The macro-file data is stored in the terminal device 21.

For example, the maintenance-service staff or the like clicks the reference button 52, so as to select the macro-file data, or inputs data on the file name directly into the macro-specification field 51.

Then, after the macro-file data used for acquiring the log is specified in the macro-specification field 51, the maintenance-service staff or the like clicks the transmission button 53. Subsequently, the macro-file data stored in the terminal device 21 is transmitted to the recording-and-reproducing device 1.

Processing step S1 shown in FIG. 4 indicates that the macro-file data is transmitted from the terminal device 21 to the Web server 31 of the recording-and-reproducing device 1 via the network 20 by performing the above-described operation. Upon receiving the macro-file data, the Web server 31 transfers the macro-file data to the log-macro task 32, at processing step S2.

The log-macro task 32 analyzes the macro-file data transferred from the Web server 31 and converts the macro-file data into strings such as the ASCII strings that can be interpreted by the console task 34, at processing step S3. Then, log-data items corresponding to the operation tasks 35a, 35b, and so forth are acquired in sequence, which corresponds to the log-acquisition operation performed according to the macro-file data.

That is to say, the log-macro task 32 transfers a log request made for a predetermined operation task 35x to the serial-input-and-output task 33, at processing step S4, where the operation task 35x denotes one of the operation tasks 35a, 35b, 35c, and so forth. The serial-input-and-output task 33 transfers the log request to the console task 34, at processing step S5.

The console task 34 performs processing, so as to acquire the log data from the operation task 35x according to the log request, at processing step S6, and acquires the log data, at processing step S7. In that case, the console task 34 executes a function defined by the operation task according to a debug-command string defined by the operation task 35x. Then, the console task 34 acquires log data stored in the operation task 35x, as a binary code, where the acquired log data includes ASCII strings.

Then, the console task 34 transfers the log data including the ASCII strings to the serial-input-and-output task 33, at processing step S8.

The serial-input-and-output task 33 transfers the log data including the ASCII strings to the log-macro task 32, at processing step S9.

The log-macro task 32 stores the log data transferred thereto in log-file data that will be downloaded to the terminal device 21, at processing step S10.

The log-macro task 32 makes a request for the log on the basis of the macro-file data transmitted from the terminal device 21 so that the above-described processing steps S4 to S10 are performed. The processing steps S4 to S10 are performed for each of the operation tasks 35a, 35b, and so forth. That is to say, the processing steps S4 to S10 are performed repeatedly.

After acquiring the log data from each of the concerned operation tasks 35a, 35b, and so forth, the log-macro task 32 notifies the Web server 31 that the log-data acquisition is completed, at processing step S11.

Figure 5B:
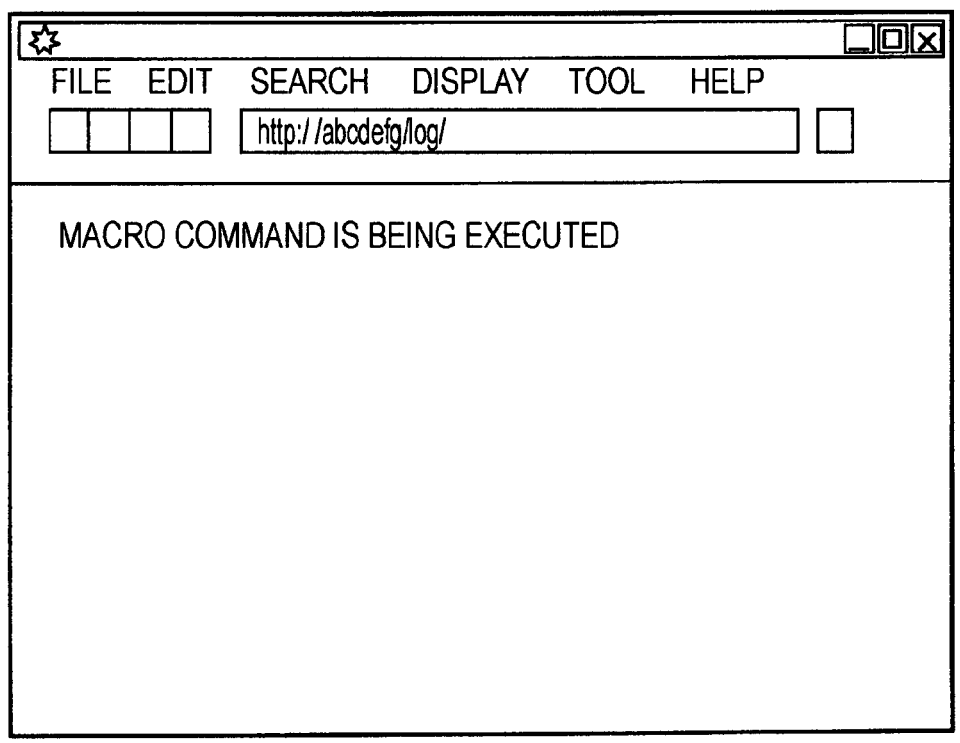
FIG. 5B illustrates another Web page according to the above-described embodiment.

While the log-macro task 32 acquires the log data, as described above, the Web server 31 displays a Web page indicating that a macro command is executed, as shown in FIG. 5B, so as to inform the maintenance-service staff or the like on the terminal-device-21 side that the log-data acquisition is currently performed.

Figure 6A:
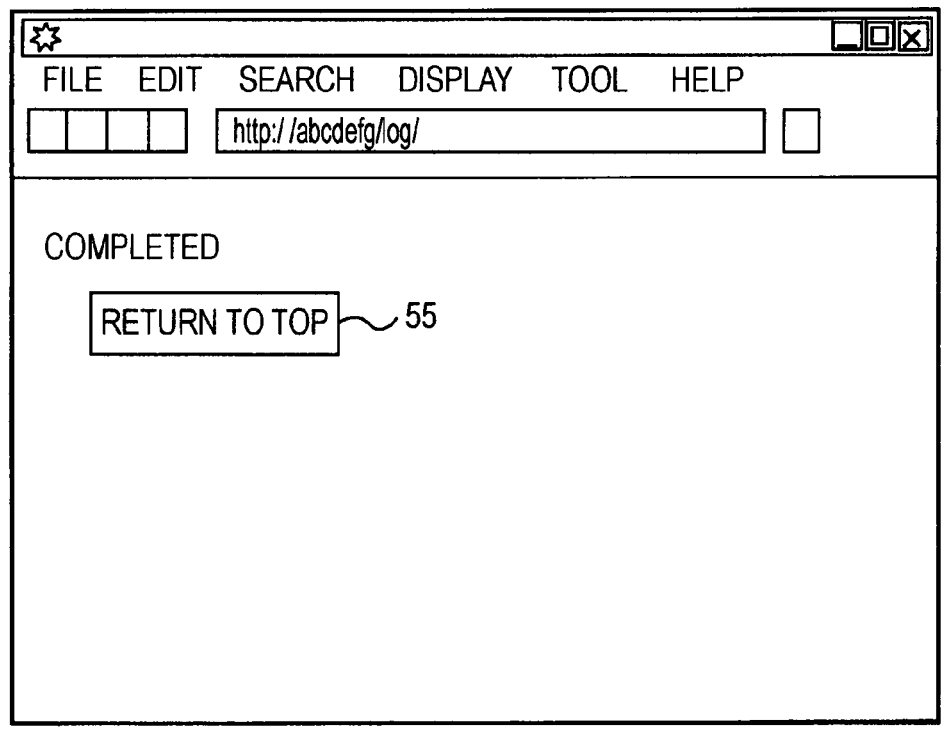
FIG. 6A illustrates another Web page according to the above-described embodiment.

Upon being notified that the log-data acquisition is completed by the log-macro task 32, the Web server 31 displays a Web page indicating that the log-data acquisition is completed and a return button 55 provided, so as to return to the top-screen image, as shown in FIG. 6A.

By seeing the screen image shown in FIG. 6A, the maintenance-service staff or the like on the terminal-device-21 side can find out that the log acquisition is completed on the recording-and-reproducing-device-1 side. After confirming the information shown on the above-described screen image, the maintenance-service staff or the like clicks the return button 55. Subsequently, a screen image generated and presented by the Web server 31 becomes the same as that shown in FIG. 5A. Namely, the screen image returns to the top-screen image shown in FIG. 5A.

The maintenance-service staff or the like on the terminal-device-21 side clicks the log-acquisition-start button 54 shown on the screen image shown in FIG. 5A so that the recording-and-reproducing device 1 transmits the log-file data to the terminal device 21. Subsequently, the terminal device 21 transmits a log-file-acquisition request to the Web server 31, at processing step S12.

Upon receiving the log-file-acquisition request, the Web server 31 requests the log-macro task 32 to transfer the log-file data, at processing step S13.

Upon receiving the request which is made, at processing step S13, the log-macro task 32 transfers the stored log-file data to the Web server 31, at processing step S14, where the log-file data includes data on the log of each of the operation tasks 35a, 35b, and so forth, as the ASCII codes.

Figure 6B:
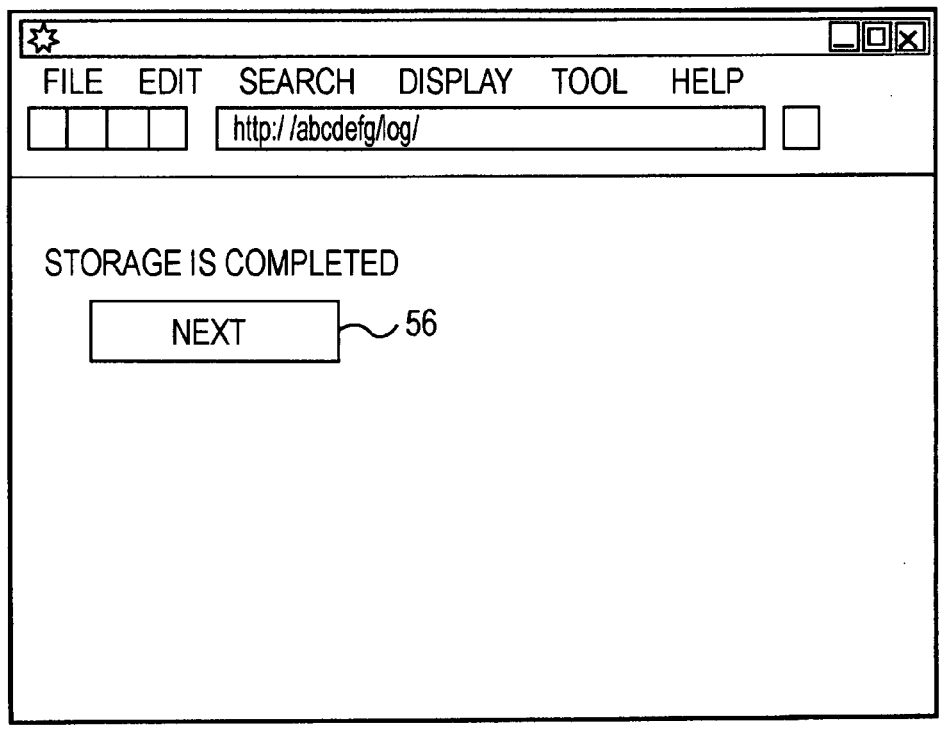
FIG. 6B illustrates another Web page according to the above-described embodiment.

The Web server 31 downloads the above-described log-file data to the terminal device 21, at processing step S15, so that the log-file data is transmitted to the terminal-device-21 side. After the downloading of the log-file data is finished, the Web page shown in FIG. 6B is displayed, and the maintenance-service staff or the like on the terminal-device-21 side clicks a next button 56. Subsequently, the Web page shown in FIG. 6A is displayed on the display screen. When the maintenance-service staff or the like clicks the return button 55, the image shown on the display screen returns to the top-screen image shown in FIG. 5A.

As has been described, the data on the log of each of the tasks of the recording-and-reproducing device 1 is acquired and transmitted to the terminal device 21. Subsequently, the maintenance-service staff or the like on the terminal-device-21 side can confirm the log of the recording-and-reproducing device 1.

If a problem occurs in the recording-and-reproducing device 1, for example, the log data can be acquired on the terminal-device-21 side via the network 20 by performing the above-described operations. Therefore, even though the recording-and-reproducing device 1 used on the user's side is not brought in, the maintenance-service staff or the like can inspect the log data stored in the recording-and-reproducing device 1 and determine the cause of the problem by using the terminal device 21 in a remote location. If it is determined that the problem can be solved by taking simple measures, the maintenance-service staff or the like informs the user of the measures by making a telephone call, sending an electronic mail, and so forth, so that the recording-and-reproducing device 1 can be repaired.

That is to say, it becomes possible to inspect and/or repair an electronic device such as the recording-and-reproducing device 1 with significant efficiency.

Further, the user does not have to open the cabinet of the recording-and-reproducing device 1 and connect the recording-and-reproducing device 1 to a PC or the like. Of course, if the recording-and-reproducing device 1 is brought into a shop where the maintenance-service staff or the like is present, the log data can be easily acquired from the recording-and-reproducing device 1 according to the above-described manner.

Further, the user does not have to install a software program provided, so as to acquire the log, in the PC or the like on the user's side for acquiring the log on the user's side.

Further, the user performs the log-information-acquisition operation by using the log-acquisition environment presented by the Web server 31, as the Web page. More specifically, the user performs operations, so as to transmit the macro-file data and the log-acquisition request by using the Web page, which reduces erroneous commands transmitted to the recording-and-reproducing device 1.

According to the above-described embodiment, the recording-and-reproducing device 1 has been described, as the example electronic device. However, the present invention can be used for other electronic devices. For example, the present invention can be used for various electronic devices and/or appliances including an audio device, a video device, a recording-and-reproducing device, a communication device, an information-processing device, a home-electrical appliance, and so forth. Particularly, the present invention can be used for an electronic device including a controller provided, as a microcomputer and/or a processor, where the controller controls an operation performed by the electronic device. Namely, the above-described electronic device is an electronic device that can store log data and that can be connected to a network.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic device comprising:
a server configured to present a log-acquisition environment to a terminal device connected to the electronic device via a network, receive macro-file data and a log-acquisition request that are transmitted from the terminal device by using the log-acquisition environment, and transmit first log information to the terminal-device according to the log-acquisition request, the first log information comprising a history of operation tasks of the electronic device, the server being configured to present a log-acquisition environment including a macro-file data retrieval operation for retrieving macro-file data stored in a file at the terminal; and a macro-filed processing unit configured to capture second log information of an operation task by performing processing on the basis of the macro-file data transferred from the server, the processing comprising execution of a function defined by the operation task according to a debug command string defined by the operation task,
wherein the macro-processing unit is further configured to store the second log information as the first log information, and
wherein the macro-processing unit includes a console task configured to execute the fuction, and acquires an output result.

2. The electronic device according to claim 1, wherein the macro-processing unit captures the second log information of the operation task, the second log information being provided, as binary data, as third log information including at least one string, and stores the third log information as log-file data.

3. The electronic device according to claim 1, wherein the macro-processing unit includes a log-macro task configured to analyze the macro-file data, converts the macro-file data into at least one string that can be interpreted by the console task, and captures at least two items of log data included in a plurality of the operation tasks in sequence according to the macro-file data.

4. The electronic device according to claim 1, wherein the server is a Web server configured to present at least one Web page to the terminal device, as the log-acquisition environment.

5. A log-output method comprising:
presenting a log-acquisition environment to a terminal device connected to an electronic device via a network, presented log-acquisition environment including a macro-file data retrieval operation for retrieving macro-file data stored in a file at the terminal,
receiving macro-file data transmitted from the terminal device by using the log-acquisition environment,
capturing first log information of an operation task by performing processing on the basis of the received macro-file data, the processing comprising execution of a function defined by the operation task according to a debug command string defined by the operation task, and acquisition of an output result;

storing the first log information as second log information;

receiving a log-acquisition request transmitted from the terminal device by using the log-acquisition environment; and transmitting the stored second log information to the terminal device according to the log-acquisition request, the second log information comprising a history of operation tasks of the electronic device.

6. The electronic device of claim 1 wherein the macro-file data originates from the terminal device.

\* \* \* \* \*